(12) United States Patent
Grüneklee et al.

(10) Patent No.: US 8,215,708 B2
(45) Date of Patent: Jul. 10, 2012

(54) ROOF CONSTRUCTION OF A VEHICLE BODY

(75) Inventors: Axel Grüneklee, Duisburg (DE); Lothar Patberg, Moers (DE); Kai Schmitz, Wermelskirchen (DE); Alfred Lösch, Tholey (DE); Ralf Stegmeyer, Medebach (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 97 days.

(21) Appl. No.: 12/675,327

(22) PCT Filed: Sep. 4, 2008

(86) PCT No.: PCT/EP2008/061698
§ 371 (c)(1),
(2), (4) Date: May 11, 2010

(87) PCT Pub. No.: WO2009/030730
PCT Pub. Date: Mar. 12, 2009

(65) Prior Publication Data
US 2010/0259073 A1    Oct. 14, 2010

(30) Foreign Application Priority Data

Sep. 6, 2007 (DE) .......................... 10 2007 042 277

(51) Int. Cl.
*B62D 25/06* (2006.01)
(52) U.S. Cl. .............. 296/210; 296/187.12; 296/187.13; 296/193.05; 296/193.12; 296/203.03

(58) Field of Classification Search .................. 296/210, 296/216.07, 187.13, 193.12, 203.03, 193.05, 296/187.12, 203.01
See application file for complete search history.

(56) References Cited

U.S. PATENT DOCUMENTS 6,042,176 A * 3/2000 Ikeda et al. .............. 296/187.05
(Continued)

FOREIGN PATENT DOCUMENTS
DE         4313555         5/1994
(Continued)

OTHER PUBLICATIONS

International Search Report for International Application No. PCT/EP2008/061698.

*Primary Examiner* — Glenn Dayoan
*Assistant Examiner* — Gregory Blankenship
(74) *Attorney, Agent, or Firm* — Proskauer Rose LLP

(57) ABSTRACT

A body of a motor vehicle includes a lateral roof region that has an outer skin, an outer roof frame, and an inner roof frame, wherein the outer roof frame is arranged under the outer skin and the inner roof frame is arranged under the outer roof frame, and the outer skin, the outer roof frame, and the inner roof frame have a common welded flange, by means of which the outer skin and the outer and inner roof frames are connected to one another, and which is configured to receive an adhesive layer for a roof module having a roof module frame. An aspect of the invention is to provide an accident-optimized vehicle body at little expense that prevents a tearing off of the roof module, and is achieved in that the outer roof frame of the body is configured as a locking element for the roof module frame.

13 Claims, 2 Drawing Sheets

U.S. PATENT DOCUMENTS

| | | | |
|---|---|---|---|
| 6,126,230 A * | 10/2000 | Ikeda et al. | 296/187.05 |
| 6,299,242 B1 * | 10/2001 | Birkert | 296/205 |
| 6,340,204 B1 * | 1/2002 | Seifert | 296/216.07 |
| 6,554,350 B2 * | 4/2003 | Takahara | 296/187.05 |
| 7,144,076 B2 * | 12/2006 | Wendler et al. | 296/210 |
| 7,213,874 B2 * | 5/2007 | Osterberg et al. | 296/210 |
| 7,810,871 B2 * | 10/2010 | Matsui | 296/187.12 |
| 7,900,997 B2 * | 3/2011 | Hosaka et al. | 296/193.12 |
| 2003/0141747 A1 * | 7/2003 | Honma et al. | 296/203.03 |
| 2004/0212222 A1 * | 10/2004 | Katsuma | 296/203.03 |
| 2006/0237997 A1 * | 10/2006 | Wendler et al. | 296/193.04 |
| 2010/0140982 A1 * | 6/2010 | Hosaka et al. | 296/210 |
| 2011/0121614 A1 * | 5/2011 | Kobayashi et al. | 296/210 |
| 2011/0248527 A1 * | 10/2011 | Ono | 296/210 |

FOREIGN PATENT DOCUMENTS

| | | |
|---|---|---|
| DE | 10249412 | 5/2004 |
| DE | 10254573 | 5/2004 |
| DE | 10254773 | 6/2004 |
| DE | 10307621 | 9/2004 |
| EP | 1422126 | 5/1994 |
| EP | 1048553 | 11/2000 |
| JP | 2004130986 | 4/2004 |

* cited by examiner

ROOF CONSTRUCTION OF A VEHICLE BODY

CROSS-REFERENCE TO RELATED APPLICATIONS

This application is a National Phase Application of International Application No. PCT/EP2008/061698, filed on Sep. 4, 2008, which claims the benefit of and priority to German patent application no. DE 10 2007 042 277.8-56, filed on Sep. 6, 2007. The disclosures of the above applications are incorporated herein by reference in their entirety.

FIELD OF THE INVENTION

The invention relates to a body of a motor vehicle, in which the lateral roof area has an outer skin, an outer roof frame and an inner roof frame, wherein the outer roof frame is arranged under the outer skin and the inner roof frame is arranged under the outer roof frame, and the outer skin, the outer roof frame and the inner roof frame have a common weld flange, by means of which the outer skin, the outer and the inner roof frames are connected to one another and which is designed to accommodate an adhesive layer for a roof module having a roof module frame.

BACKGROUND

Different functions of a motor vehicle roof are ensured in motor vehicles by means of roof modules. The motor vehicle body is often specifically designed to accommodate roof modules. The rigidity of the motor vehicle roof is ensured by means of a roof module frame, although a variety of functions is fulfilled. The roof module frames, for the most part, are connected to the body by means of adhesive bonds with the result that the body has to provide corresponding adhesive joints. The firmness of the adhesive bond used here does not generally equal that of a laser-soldered connection. Laser-soldered connections are often used in conventional roofs, wherein the outer skin of the roof is laser-soldered to the body. Although laser-soldered roofs do not have any roof module frames, they do mostly have one to three cross beams to ensure rigidity. The body must then be designed to accommodate the roof cross members. With bonded roof modules there is, in principle, the danger that the bond seam between the roof module frame and the body will break and that the roof module will break away from the motor vehicle. Breaking away of the roof must, however, be avoided, since then the overall rigidity of the passenger cabin decreases considerably and its properties in the case of deformation caused by an accident are impaired considerably. To prevent the roof module from breaking away and thus reducing the solidity of the passenger cabin in the event of an accident, it is known from the German published patent application DE 102 54 773 A1 to provide a retaining element on the roof module, into which the lateral roof frame of the motor vehicle body plunges in the event of a side impact and prevents the roof module from breaking away. Attaching the retaining element to the roof module is, however, labor-intensive. Moreover, the retaining elements impede the use of a roof module frame which is required to provide reinforcement. In addition, an increase in the flexibility of the use of the body would be desirable in the sense that the body, irrespective of whether a roof module or a conventional roof is to be used, is already fixed when the motor vehicle is ordered. Up to now, the bodies have been specifically designed for the use of conventional roofs or roof modules, so that the bodyshell work can only begin when the motor vehicle is ordered.

SUMMARY OF THE INVENTION

Based on the above, an aspect of the present invention is to propose a motor vehicle body which is accident-optimized and which with little cost and effort prevents the roof module from breaking away.

According to a first teaching of the present invention, the above disclosed aspect is achieved by the outer roof frame of the body being designed as a locking element for the roof module frame.

It has been shown that the outer roof frame, which in conjunction with the inner roof frame is often described as a side member, can be used as a locking element in such a way that in a crash locking with the lateral roof module frame occurs and breaking away of the roof module is prevented. Since the outer roof frame of the motor vehicle body is used as a locking element, a retaining element is no longer necessary on the roof module and the labor costs for producing an accident-optimized motor vehicle body in the roof area are considerably reduced. Further advantages result from the fact that the behavior of the body in the event of a side impact can be specifically controlled via the geometrical cross-sectional shape of the outer roof frame.

According to a first embodiment of a body according to the invention, one part of the outer roof frame of the body extends above the weld flange, wherein one area of the outer roof frame sloping away to the weld flange occupies an angle of more than 45° to the plane of the weld flange. This outer roof frame embodiment demonstrates a particularly simple possibility for designing the outer roof frame as a locking element. In the event of a side impact, this design prevents the outer roof frame from sliding past the roof module frame and the connection between body and roof module frame from loosening. Breaking away of the roof module is thereby prevented.

According to a subsequent, refined embodiment of the body according to the invention, the behavior of the body in an accident is further improved by the highest point of the part of the outer roof frame extending above the weld flange having a vertical distance from the weld flange of at least 40% of the vertical distance between the highest point of the outer skin and the weld flange.

The locking of the outer roof frame with the roof module support can be further strengthened by the angle of an area of the outer roof frame sloping away to the weld flange being more than 90° to the plane of the weld flange and forming an undercut with the weld flange. The result obtained through this is that the outer roof frame grips hard together with the outer skin and the roof module frame when the body is deformed, so that particularly secure locking is produced between the roof module frame and the body.

According to a subsequent, refined embodiment of the body according to the invention, the area of the outer roof frame extending above the weld flange is formed by an additional block element connected to the outer roof frame in a positive, non-positive or firmly bonded fit. This block element can, for example, be realized by means of a sheet correspondingly adapted and welded on. In particular, bodies which have no securing arrangements for a roof module can be optimised in relation to their deformation properties via the additional block element in the event of an accident.

Preferably, the outer skin of a subsequent, refined embodiment of the body according to the invention occupies an angle of 1° to 10° to the vertical in an area sloping away to the weld flange. This angle enables the body to be used both for a roof module and for a laser-soldered roof The angle also ensures that, on the one hand, an edge is formed between laser-soldered roof and body which enables the laser solder to run in between the contact surface of the roof skin and body and enables degassing of the laser solder, so that a clean laser-soldered seam is formed. On the other hand, roof modules can be applied more easily during final assembly using this embodiment of the body.

In order to provide the strengths required for the outer and/or inner roof frames with the least weight possible, preferably the outer and/or inner roof frames consist of a high-strength or ultra high-strength steel. In particular, a steel alloy of the 22MnB5 type (boron steel) has particularly outstanding strength properties in relation to the use for the outer and/or inner roof frames of the motor vehicle body.

According to a further embodiment of the body according to the invention, the exacting requirements with regard to the rigidity of the body and its deformation stability are met by the sheet thicknesses being 0.8 mm to 2 mm for the outer and/or inner roof frames of the body. By using high-strength or ultra high-strength steel goods, such as for example 22MnB5, high deformation rigidities can be obtained with little weight despite the sheet thicknesses.

Finally, the body according to the invention can be advantageously developed by the weld flange being at least 15 mm wide. This minimum width ensures, on the one hand, that the outer skin, the outer roof frame and the inner roof frame in the lateral roof area of the body can be connected to one another by conventional spot-welding and, on the other hand, that a sufficient surface area is provided to apply the adhesive layer for gluing the roof module to the motor vehicle body.

BRIEF DESCRIPTION OF THE DRAWINGS

There are a number of possible embodiments of the body according to the invention. For illustration purposes, reference is made to the description of three exemplary embodiments in conjunction with the drawing. The drawings show in FIG. 1 a first exemplary embodiment of a body according to the invention in a schematic sectional view, FIG. 2 a second exemplary embodiment in a schematic sectional view having an outer roof frame forming an undercut, FIG. 3 a third exemplary embodiment of the body according to the invention having an additional locking element for the outer roof frame in a schematic sectional view.

DETAILED DESCRIPTION

Figure 1:
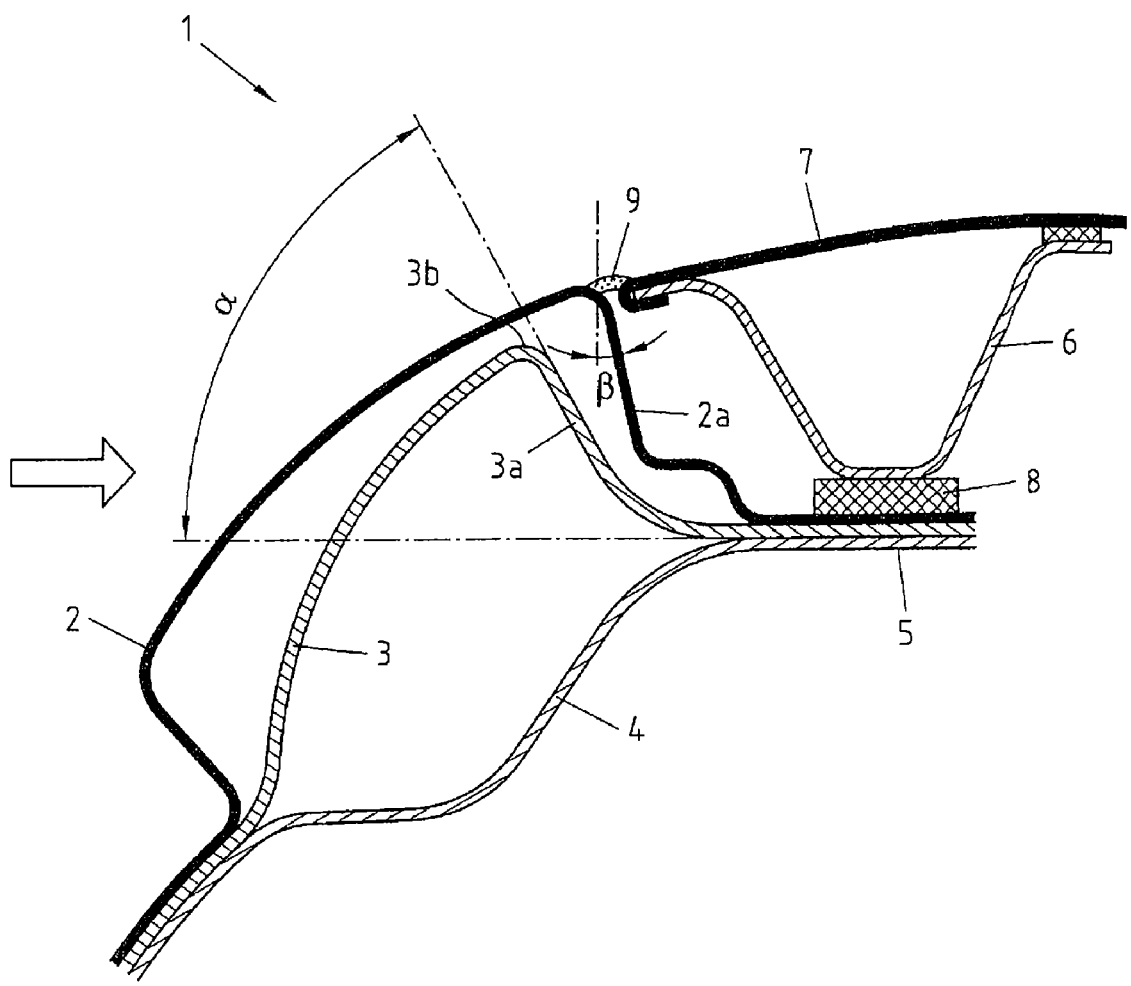

FIG. 1 now shows in a schematic sectional view the lateral roof area 1 of an exemplary embodiment of a body according to the invention. This has an outer skin 2, an outer roof frame 3 and an inner roof frame 4. The outer skin 2, the outer roof frame 3 and the inner roof frame 4 are connected to one another by means of a weld flange 5. The outer skin is typically a very thin sheet having a thickness of approximately 0.7 mm, whereas the outer roof frame 3 and the inner roof frame 4 are predominantly produced from high-strength or ultra high-strength materials, for example from a type 22MnB5 steel alloy, and with sheet thicknesses of 0.8 mm to 2 mm provide the required strength for the body.

The outer roof frame 3, which together with the inner roof frame 4 form the side member of the body, is formed as a locking element in the present exemplary embodiment, which in the case of deformation by a force in the direction of the arrow, i.e. in the case of a side impact, locks with the roof module frame 6 of the roof module 7.

There are many possibilities with regard to designing the outer roof frame 3 as a locking element, wherein in particular the deformation behavior and the locking behavior can be influenced by the geometrical shape of the outer roof frame 3. In the exemplary embodiment illustrated in FIG. 1, a part of the outer roof frame 3, for example, extends above the weld flange 5, in particular above the adhesive layer 8, with which the roof module 7 via the roof module frame is attached to the body. This part of the outer roof frame 3 has an area 3a sloping away to the weld flange 5, which occupies an angle a of more than 45° with the weld flange. In addition, the distance of the highest point of the outer roof frame is selected such that the vertical distance to the weld flange 5 is more than 40% of the vertical distance between the highest point of the outer skin and the weld flange, so that the locking of the outer roof frame 3 with the roof module frame 6 is particularly well assured.

In order to ensure the most flexible use of the motor vehicle body, the angle β between the outer skin in the lateral roof area of the body can be 1° to 10° to the vertical in an area 2a sloping away to the weld flange 5. In the present exemplary embodiment, the angle β is 2° to 8°. In order to prevent dirt and moisture from penetrating into the intermediate area between the lateral roof area of the body 1 and the roof module frame, a seal 9 is provided, where appropriate in conjunction with a sealing agent, which is applied between the outer skin 2 and the outer skin of the roof module 7.

Figure 2:
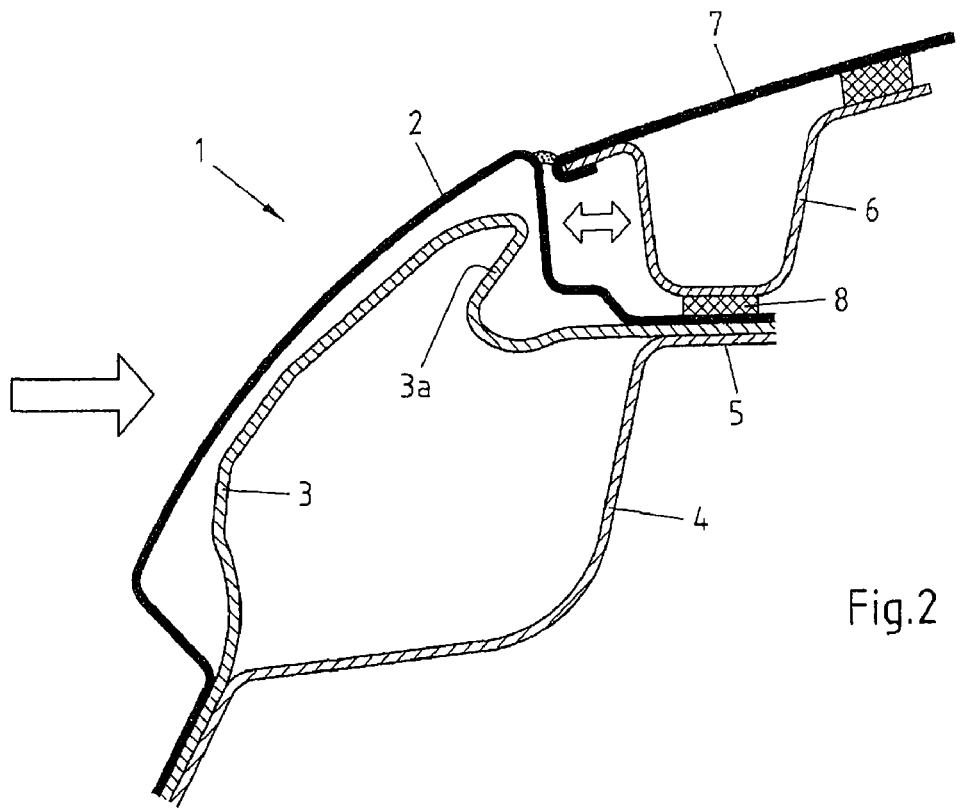

In FIG. 2 an exemplary embodiment of a motor vehicle body according to the invention is now illustrated, which has an outer roof frame 3 in the lateral roof area, which in the area 3a sloping away to the weld flange 5 occupies an angle of more than 90° to the plane of the weld flange and forms an undercut to the weld flange. This undercut ensures, as already stated, that locking of the roof module frame is further assured by the outer roof frame 3 gripping hard with the roof module frame 6 in the event of deformation due to an accident.

Figure 3:
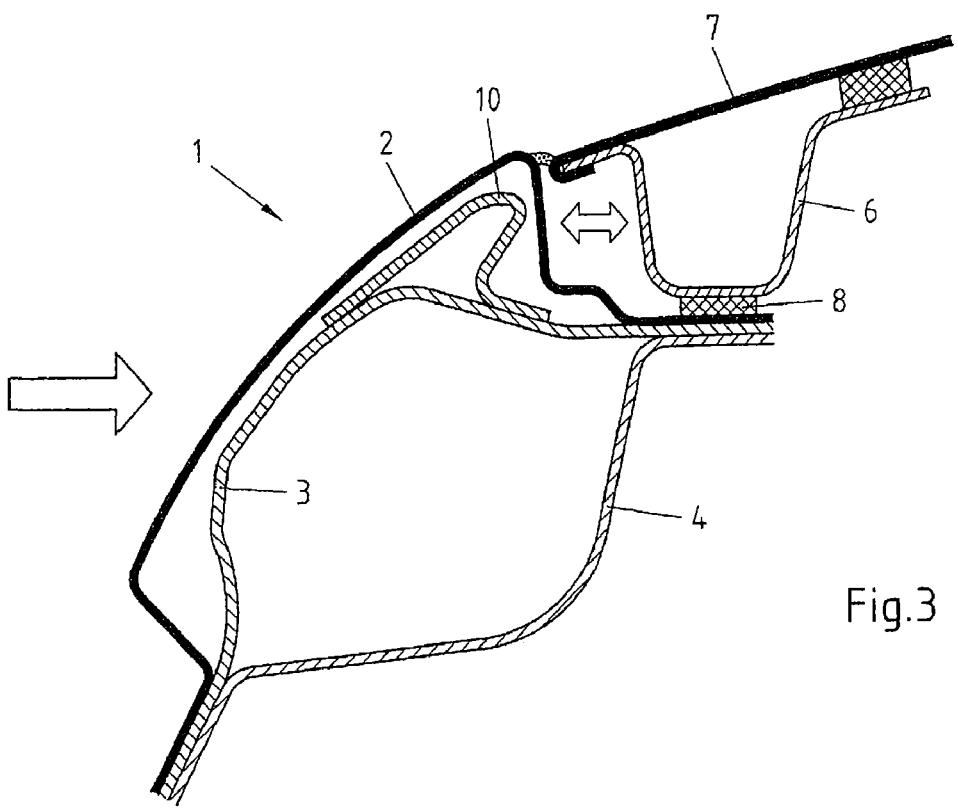

The exemplary embodiment of the body according to the invention illustrated in FIG. 3, contrary to the previously illustrated exemplary embodiment, has an additional locking element 10 which ensures that the lateral roof area locks with the roof module frame 6 in the case of deformation in the event of an accident or a side impact and through this breaking away of the roof module is prevented in an effective manner. The deformation properties of the body can be influenced very easily by means of the geometrical shape of the locking element 10.

What is claimed is:

1. Body of a motor vehicle, in which the lateral roof area has an outer skin, an outer roof frame and an inner roof frame, wherein the outer roof frame is arranged under the outer skin and the inner roof frame is arranged under the outer roof frame, and the outer skin, the outer roof frame and the inner roof frame have a common weld flange, by means of which the outer skin, the outer and the inner roof frames are connected to one another and which is designed to accommodate an adhesive layer for a roof module having a roof module frame, and wherein the outer roof frame of the body is designed as a locking element for the roof module frame, at least one part of the outer roof frame of the body extends above the common weld flange, wherein an angle of an area of the at least one part of the outer roof frame sloping away to the common weld flange is more than 90° to the plane of the common weld flange and forms an undercut with the common weld flange.

2. Body according to claim 1, wherein a highest point of the at least one part of the outer roof frame of the body extending above the common weld flange has a vertical distance from the common weld flange of at least 40% of a vertical distance between the highest point of the outer skin and the common weld flange.

3. Body according to claim 1, wherein the at least one part of the outer roof frame extending above the common weld flange is formed by an additional block element connected to the outer roof frame in a positive, non-positive or firmly bonded fit.

4. Body according to claim 1, wherein the outer skin in the lateral roof area of the body occupies an angle of 1° to 10° to a vertical in an area sloping away to the common weld flange.

5. Body according to claim 1, wherein the outer and/or inner roof frames consist of a high-strength or ultra high-strength steel.

6. Body according to claim 1, wherein sheet thicknesses of the outer and/or inner roof frames are 0.8 mm to 2 mm.

7. Body according to claim 1, wherein the common weld flange is at least 15 mm wide.

8. Body of a motor vehicle, in which the lateral roof area has an outer skin, an outer roof frame and an inner roof frame, wherein the outer roof frame is arranged under the outer skin and the inner roof frame is arranged under the outer roof frame, and the outer skin, the outer roof frame and the inner roof frame have a common weld flange, by means of which the outer skin, the outer and the inner roof frames are connected to one another and which is designed to accommodate an adhesive layer for a roof module having a roof module frame, and wherein the outer roof frame of the body is designed as a locking element for the roof module frame, at least one part of the outer roof frame of the body extends above the common weld flange, wherein one area of the outer roof frame sloping away to the common weld flange occupies an angle of more than 45° to the plane of the common weld flange, wherein the at least one part of the outer roof frame extending above the common weld flange is formed by an additional block element connected to the outer roof frame in a positive, non-positive or firmly bonded fit.

9. Body according to claim 8, wherein a highest point of the at least one part of the outer roof frame of the body extending above the common weld flange has a vertical distance from the common weld flange of at least 40% of a vertical distance between the highest point of the outer skin and the common weld flange.

10. Body according to claim 8, wherein the outer skin in the lateral roof area of the body occupies an angle of 1° to 10° to a vertical in an area sloping away to the common weld flange.

11. Body according to claim 8, wherein the outer and/or inner roof frames consist of a high-strength or ultra high-strength steel.

12. Body according to claim 8, wherein sheet thicknesses of the outer and/or inner roof frames are 0.8 mm to 2 mm.

13. Body according to claim 8, wherein the common weld flange is at least 15 mm wide.

\* \* \* \* \*